Feb. 29, 1944. A. J. SPELKER 2,343,031
SHIELDED MARKING
Filed April 9, 1942 2 Sheets-Sheet 1
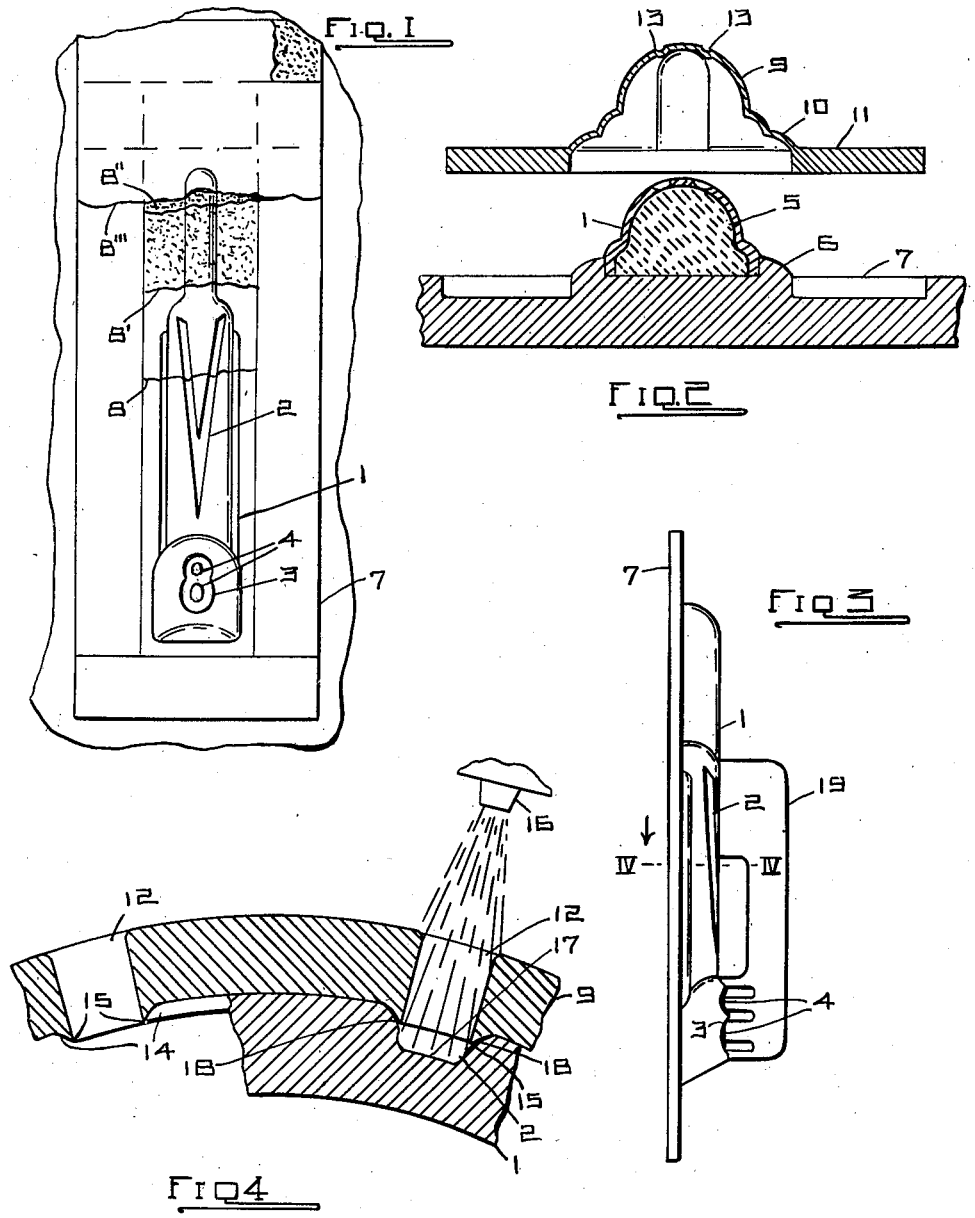
Inventor
ALBERT J. SPELKER Feb. 29, 1944.　　　A. J. SPELKER　　　2,343,031
SHIELDED MARKING
Filed April 9, 1942　　2 Sheets-Sheet 2
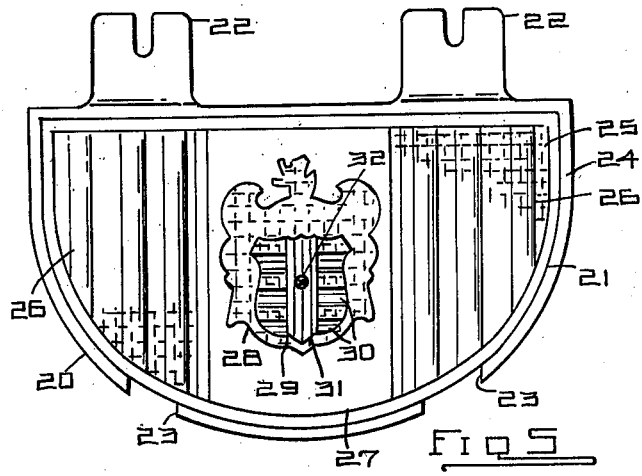
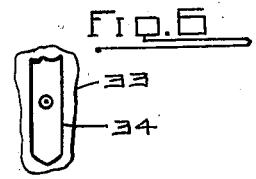
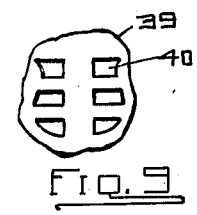
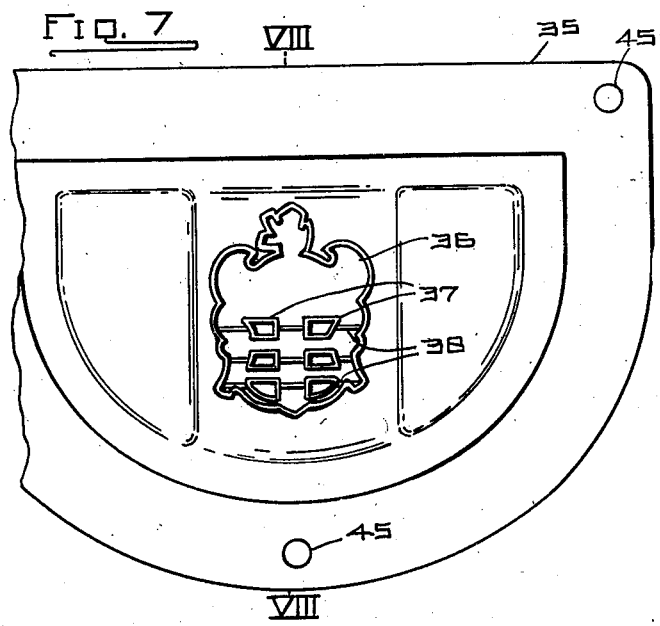
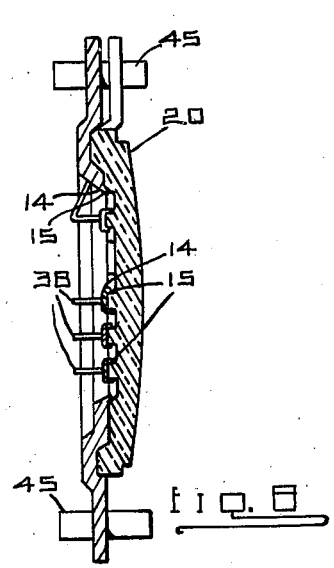
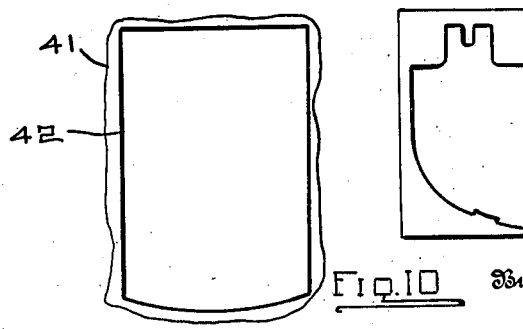
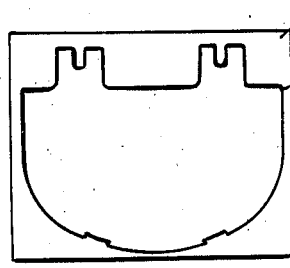
Inventor
ALBERT J. SPELKER
By
Attorney Patented Feb. 29, 1944

2,343,031

UNITED STATES PATENT OFFICE 2,343,031

SHIELDED MARKING

Albert J. Spelker, Toledo, Ohio

Application April 9, 1942, Serial No. 438,289

2 Claims. (Cl. 101—128.2)

This invention relates to control of outlines upon an object.

This invention has utility in production of definite conforming tools in repetitive marking out of special form for contour upon articles even in departure from planar background or foreground and to extend to offset regions of the rising or descending bounds therefor. The range is considerably broadened from application to an opaque to a transparency when the exposed area is planar or smooth, thereby giving a relief effect or actually a showing in three dimensions in contrasting color relations.

Referring to the drawings:

Fig. 1 is a view, with parts broken away, of a set-up of a proof for developing a counterproof therefrom;

Fig. 2 is a distributed view in section of the counterproof as severed from the proof of Fig. 1;

Fig. 3 is a side view of the counterproof having the bridging means for the completed article or tool;

Fig. 4 is a partial section on the line IV—IV, Fig. 3, showing the fin relationship of the counterproof as to the proof, and is considerably enlarged;

Fig. 5 is a view of a transparency proof or body element for a multi-stage colored background therefor;

Fig. 6 is a fragmentary detail showing of the window for the shield for applying at the rear in the design region, herein shown as a cavity on the proof, the counterproof window say being for red;

Fig. 7 is a view of the shield or mask on the side to receive the transparency base with the window to disclose the region to receive, say the gilt or contrast from the red, but here leaving opening for the gilt to be applied on the red back, even to the extent of thereby filling the clearance around the dot;

Fig. 8 is a section on the line VIII—VIII, Fig. 7, showing the transparency, say of plastic, in nesting relation or register therewith;

Fig. 9 is a fragmentary view showing the window for an additional contrasting color application, say blue, in the portion of the showing of Fig. 7 shielded or masked out therefrom;

Fig. 10 is a view showing the window for the gilt bounded shield, say as white, and for a coating back of the gilt, red, and blue on the shield; and Fig. 11 is a view on a reduced scale of the contour of the emblem or transparency outline for full form coating as a final one on the back thereof, say of gilt, notwithstanding there may be a pre-coating of gilt in the bounds of the shield.

In the instance of working with opaque objects, the effective marking hereunder to accentuate a design may be for the exposed surface thereof, and the design be a relief or offset, whether cameo or intaglio. Furthermore, the range hereunder is such that the background or foreground for such design as sunken, whether plus or minus, may be of non-planar contour as to such background or foreground. As an instance herein, there is taken metal proof 1 (Figs. 1, 2) having countersink designs 2, 3, therein, with the regions 4 of the design 3 upwardly from the background 3. In the production of counterproof hereunder, steps for accuracy in such copying do not stop with approximation of the form, but involve peculiar refinement in practical achievement of the results hereunder. The counterproof or copying may even be a stamping, but such as in other instances hereunder does not respond to the completed practical achievement. Building up of the pattern or counterproof may be more economically achieved from a commercial viewpoint than the stamping, whether such building up be by spraying a heavy coating in severable relation as to the proof, or whether such spray be a paint, plastic, or metal, or be effected through electrodeposit.

For this production of a counterproof from a proof, in the event the proof body 1 be one which it is desired to give increased rigidity, then filler reinforcement 5 (Fig. 2) of gypsum may be cast therein. Against shifting, wax 6 may be fused thereabout in providing a sustaining or holding bed with frame or base bounds 7. From this base bounds 7, but extending over the design article 1, may be severance promoting coating 8 as a resist, say of lacquer, or thin film non-conductor coating material, as a non-metallic, even varnish or shellac character or even the film of wax.

With this readily fusible or severable skin to establish the contour, a conductor coating is next in order therefor in the instance of electroplating; which coating may be dispensed with in the instance there be a metal spray or other course adopted for building up the counterproof. Accordingly, on this non-readily-frangible film or coating, there may be dusted a finely powdered conductor plating 8", as graphite, powdered iron, for sulphated copper section plating 8'". The course may then be one of electrodeposit to build up counterproof body 9 (Fig. 2) having connection region 10 with base frame 11, thereby establishing form holding rigidity for this counterproof, This counterproof as so developed in the coating has design regions complementary to the regions 2, 3, 4. In the carrying out of the invention herein, windows 12 are established at these design disclosure regions 13 in the counterproof. In developing these windows care is required in forming at the proof side portion thereof fins 14 having dressed regular fin free edge terminus 15. In the practical functioning hereunder, in the instance of spray painting, spray gun 16 may blow through the window 12 to the design 2 and coat the base of the design or region 17 up the sides of the design in addition as the particular requirement may be in order. However, the fin free edge 15 in practice has its clearance 18 in such nice relation as to the proof 1 that smoking past the edge 15 does not occur. In the instance of metal designs, there is normally a rather close holding to initial shape or dimension with conformity to the proof. The counterproof may have a tolerance factor, even up to the three or four thousandths of an inch without smoking or blowing past the free edge 15 back up to depart from definite outline for the design on the proof. The achievement hereunder is one which it is the experience in successful practice to hold this tolerance in the region of one thousandth of an inch. These shields or masks as so developed will stand for this spray delivery of the marking even of sand blast on glass, but only as the proof has a standard within the tolerance limits. To accommodate to some extent there may be seating, especially in an offset design, wherein there is departure from the rigid frame or base 7 and rigid grip or holding bridge 19 (Fig. 3). This bridge 19 in practice may be weld, soldered, plate assembled with the proof before the windows are cut through, or such cut through only as to the region for the bridge or reinforcement 19, so that such bridge or handle 19 may not interfere with the subsequent enlarged completion of the cutting. Accordingly, with this pre-set bridge there is a supplemental anchoring to preserve the complementary traits for the counterproof throughout even of regions fully bounded by marking herein, as the background 3 bounding the cameo portions 4 (Fig. 1).

In the practice hereunder, the offset fin 14 may have its free edge or terminus 15 but slightly away from the foreground or background as carrying such fin in the event the side wall in the opening away from the window is to be given the coating or treatment. Again this fin free edge 15 may approximate along the side wall of the offset or to the root or summit, thereby localizing the coating or treatment to the area as bounded by the offset. With an efficient close tolerance for the area there may be greater tolerance range in the extent of the offset, thereby responding to a wider range of working conditions in the operations for repetitive markings hereunder.

Informative matter or decorations have a wide place in industry. There is constructive end achieved as such may have permanence. The metal base with offset (Fig. 1) has durability even to withstand weathering conditions. In current practice there are not only spigot markings, say "H" and "C" or "Hot" and "Cold," and for dial knobs, but more elaborate showings such as horn buttons or other decorations about the interior of an automobile. While there may be enamel finish to disclose, there is more impressive urge on the observer when the marking is seemingly embossed or offset in the sense of being in relief. With a transparency, whether glass or plastic, sunken design or different reliefs for intaglio or cameo portions on the reverse side thereof thereby provide the transparency for protection against accumulation of dirt in the embossed-appearing region. These three dimensions, maintained clean against dirt accumulation in any recesses, are an efficient marking presentation and even go into complexities such as convex article 20 (Fig. 5), wherein there is frame bounds 21 with anchorage forks 22 positioning notches 23 and design bounding flange 24. Within the bounds of this flange 24 is banner-like portion 25 having gilt or gold appearing side drape simulating portions or spaced parallel rib portions 26. This leaves central ground region 27, say of white, from which there may be appearance of upstanding ornamental gilt frame 28 as a sort of coat of arms about shield 29, having say parallel blue cross portions 30 from central red strip 31 having gilt circle 32 bounding a central red spot. To this end there may be plastic transparency blank having contrasting level regions, especially as in relief or offset at the bounds between the different color applications.

In carrying out the invention herein, there may be shield of form extent exceeding that of the general structure 20. Such general shield or form 33 (Fig. 6) has window 34 to permit, say, spray painting therethrough to lodge the color effective as red in the region 31 of the article 20, this being from the rear or back of such article.

Having in the recessed portion of the plastic blank 20 applied red pigment through the opening 34 to give the central region 31 and its dot placement, additional form 35 (Fig. 7) similar to the form 33 is in order, with window 36 to disclose on the back of the blank body 20 as carrying the red for such to provide bounds for the central coat of arms portion 28 as well as the shield portion carrying the gilt or gold effect. Thus there may be an application of this gilt on the coat of arms portion of the shield as well as red on the region 31 as previously applied through the window 34.

Sections 37 (Fig. 7) are positioned by arms 38 to hold such in appropriate register position with the plastic body 20 and blank out in this instance portions of the shield for subsequent stage form 39 (Fig. 9) with windows 40 to permit applying to the back of the plastic unit or element 20 and marking application for the blue cross strips 30.

Next in this stage of marking, there may be form 41 (Fig. 10) having window 42. In applying this structure over the plastic blank 20 having the red, gilt, and blue markings, there may be the spray application through this window 42 of the white background 27 as bounds for this shield coat of arms emblem, the white being over the coatings theretofore applied through the windows 34, 36, and 40.

In finally clearing the matter up, form 43 (Fig. 11) may have window 44. This form 43 may seat on the plastic element 20 and there be given a general gilt application, not only for the drapery-like portions 24 but over all, even the backing for the white portion 27, and this full area.

In practice, these forms 33, 35, 39, 41, 43 may have legs or supports 45 (Fig. 7) projecting both ways therefrom so that this article as handled may in its rest position on either side not impinge to disturb the nicety of the outline regions for these windows. These windows as to their bounds in each instance have fin 14 terminating in free edge 15 in close register relation with the relief or offset portion of the plastic element.

In the operations hereunder with the opaque, there is the marking effectiveness for the area or the area and its bounds more or less as may be in order. This may be rapidly achieved in conjunction with the tool hereunder with a quick drying substance as sprayed or in a discontinuance in the event there be a drying or treating action. This artistic refinement in the opaque is in the realm of superb achievement in artistry under the back marking wherein there is relief in a transparency, say, of the plastic type. The contrasting treated or color regions may be on approximately common planes with groove or rib spacer or may be in markedly or slightly different planes. However, a second projection region as offset bounds is important hereunder for preservation of the particular design section against encroaching upon another, at least in the finishing disclosure treatment therefore as to the appearance. It is thus seen that with the window for say the first coat red definitely shielded against smoking, red does not appear in the regions to which the blue or gilt bounds disclose. In the sequence such may be as found convenient. The showing herein as to the item 20 involves the gold or gilt backing for the red in applying the coat of arms and shield sections except for the blue. The body portions 37 are obscuring provision for the windows 40 of a succeeding stage. As disclosed then from the window 40 blue application, there may be the white and thereafter the gilt as additional coats, with such not to detract from but leave the exposure as of an artistic embossed showing.

This application is a continuation-in-part of my copending application for United States Letters Patent, Ser. No. 2,282,260, filed May 5, 1942, for Method of electroforming a marking tool.

What is claimed and it is desired to secure by Letters Patent is:

1. A stencil for imparting a design to the non-planar surface of a contoured article having contours at different levels spaced in depth from the topmost surface of the article and having surfaces joining the spaced contours curved and merging tangentially into the spaced contour surfaces, consisting in a counterpart of substantially constant thickness of the non-planar surface and coextensive therewith, apertures in the form of the design to be applied to the non-planar surface in the counterpart, the edges of the counterpart at the apertures extending substantially to the juncture of the curved surfaces joining the spaced surfaces of different level of the non-planar surface and forming an acute angle or fin with the surfaces of the apertures, whereby the stencil may be applied to the non-planar surface with the fin in substantially parallel sliding contact with the merging surfaces of the surface to be ornamented.

2. The method of forming a stencil for imparting a design to the non-planar surface of a contoured article having contours at different levels spaced in depth from the topmost surface of the article and having surfaces joining the spaced contours curved and merging tangentially into the spaced contour surfaces, consisting in forming a counterpart of substantially constant thickness of the non-planar surface and coextensive therewith, cutting apertures through the counterpart in the form of the design to be applied to the non-planar surface of the article, and shaping the edges of the counterpart at the bounds of the apertures to extend substantially to the juncture of the curved surfaces joining the spaced surfaces of different level of the non-planar surface by there beveling into an acute angle or fin, whereby the completed stencil may be applied to the non-planar surface with the fin in substantially parallel sliding contact with the merging surfaces of the article to be ornamented.

ALBERT J. SPELKER.